(12) United States Patent
Alameh et al.

(10) Patent No.: US 9,587,979 B2
(45) Date of Patent: Mar. 7, 2017

(54) ELECTRONIC DEVICE WITH INFRARED SENSOR-BASED USER INPUT CONTROLS

(71) Applicant: Motorola Mobility LLC, Chicago, IL (US)

(72) Inventors: Rachid M Alameh, Crystal Lake, IL (US); William S Hede, Lake in the Hills, IL (US); Jiri Slaby, Buffalo Grove, IL (US)

(73) Assignee: Google Technology Holdings, LLC, Mountain View, CA (US)

( * ) Notice: Subject to any disclaimer, the term of this patent is extended or adjusted under 35 U.S.C. 154(b) by 10 days.

(21) Appl. No.: 14/276,098

(22) Filed: May 13, 2014

(65) Prior Publication Data

US 2015/0331542 A1    Nov. 19, 2015

(51) Int. Cl.
| | |
|---|---|
| *H04M 1/21* | (2006.01) |
| *H04M 1/725* | (2006.01) |
| *G06F 3/041* | (2006.01) |
| *G01J 1/04* | (2006.01) |
| *G01J 1/42* | (2006.01) |
| *G06F 1/16* | (2006.01) |
| *G06F 3/03* | (2006.01) |

(52) U.S. Cl.
CPC ............... *G01J 1/044* (2013.01); *G01J 1/42* (2013.01); *G06F 1/1626* (2013.01); *G06F 3/0304* (2013.01); *G06F 2200/1636* (2013.01)

(58) Field of Classification Search
CPC ............. G06F 3/01; G06F 3/041; H04M 1/02
See application file for complete search history.

(56) References Cited

U.S. PATENT DOCUMENTS

| | | | |
|---|---|---|---|
| 7,102,486 B2* | 9/2006 | Yamagishi | G07C 9/00166 283/68 |
| 2010/0127969 A1* | 5/2010 | Changchien | 345/156 |
| 2010/0265040 A1* | 10/2010 | Kato | 340/5.83 |
| 2013/0016053 A1* | 1/2013 | Jung | 345/173 |

* cited by examiner

*Primary Examiner* — Temesghen Ghebretinsae
*Assistant Examiner* — Paras D Karki
(74) *Attorney, Agent, or Firm* — Shumaker & Sieffert, P.A.

(57) ABSTRACT

An electronic device uses one or more infrared sensors to detect infrared light from a person's body (e.g., a user's finger) to initiate a function of the electronic device. According to an implementation, the housing of the electronic device includes a flexible portion that opens an aperture in response to external pressure (e.g., a user pressing down on the flexible portion) to allow infrared light from the person's body to reach an infrared sensor. When the infrared sensor detects the infrared light, it generates a signal in response. A processor of the electronic device receives the signal and, in response, initiates a function of the electronic device. The function may be any function that the electronic device is capable of performing, such as a power-on function, a camera function, changing the speaker volume, and launching an application.

16 Claims, 7 Drawing Sheets

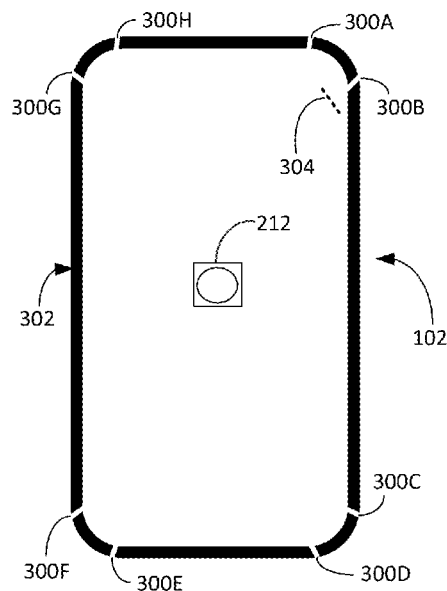
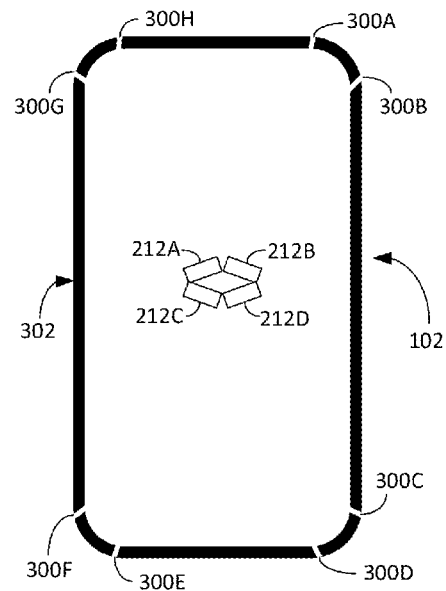
FIG. 3A
FIG. 3B
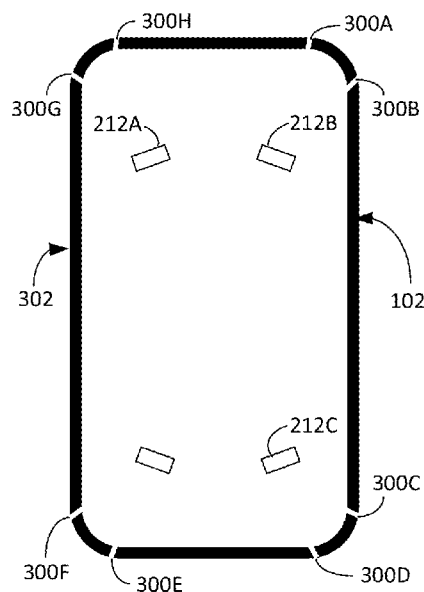
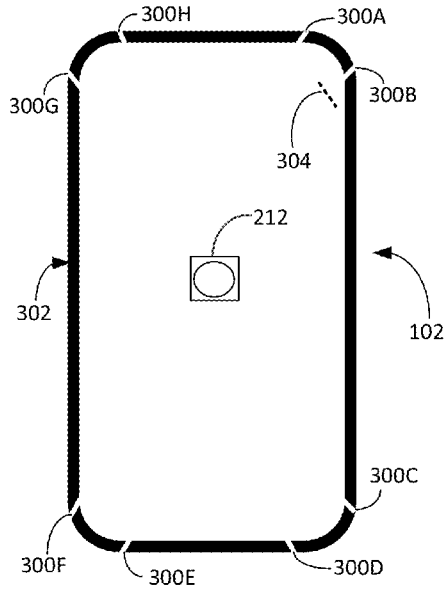
FIG. 3C
FIG. 3D

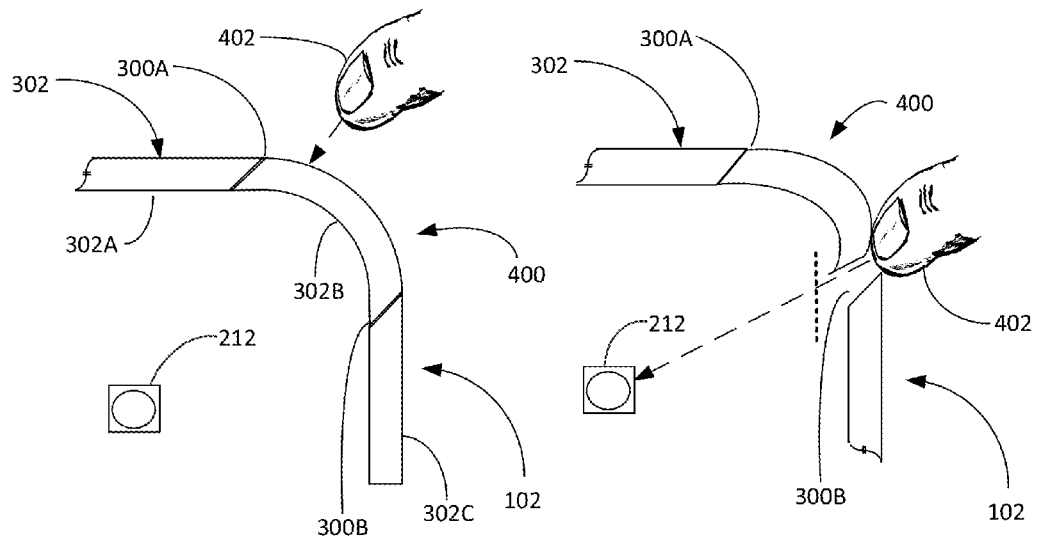
FIG. 4A
FIG. 4B
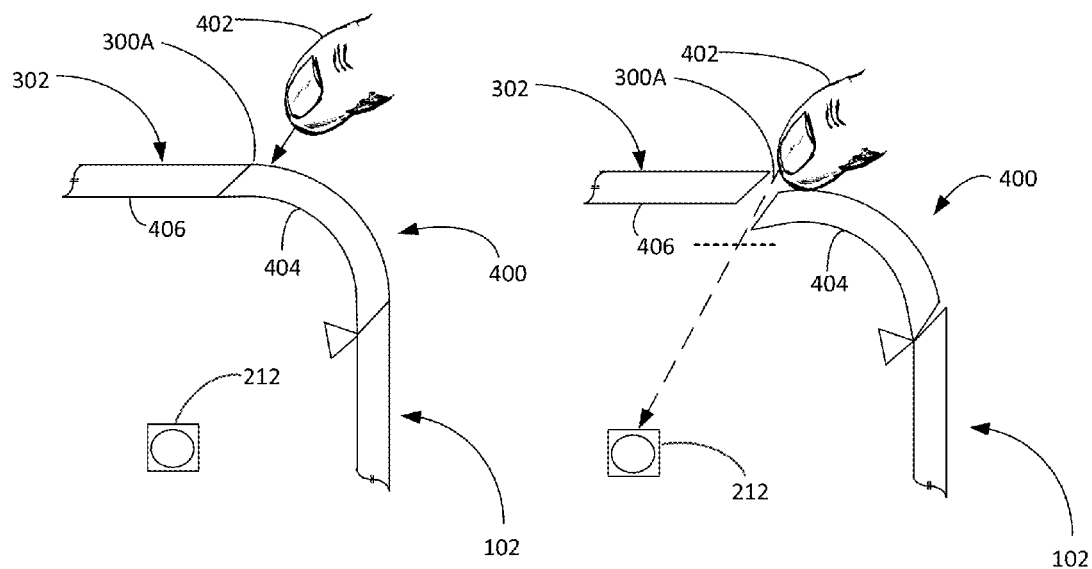
FIG. 4C
FIG. 4D

ELECTRONIC DEVICE WITH INFRARED SENSOR-BASED USER INPUT CONTROLS

TECHNICAL FIELD

The present disclosure relates to electronic devices with infrared sensor-based user input controls and, more particularly, electronic devices that use one or more infrared sensor as a substitute for buttons, touch sensors, and other traditional types of user input mechanisms.

BACKGROUND

Manufacturers of mobile electronics such as cell phones and tablet computers face many challenges in their efforts to keep their manufacturing costs low, to minimize the size of the devices compact, and to differentiate their products from those of their competitors. Among these challenges is minimizing the number of moving parts on the device. One notable effort in this regard has been the trend toward replacing physical buttons with virtual buttons through the use of touch sensors—either on the display or on some other part of the device. A common complaint about such virtual keys, however, is that it is very easy for them to be pressed accidentally, even when the user's hand is nowhere near the device. This often occurs as a result of the device bouncing around in the user's pocket or purse.

DRAWINGS

While the appended claims set forth the features of the present techniques with particularity, these techniques may be best understood from the following detailed description taken in conjunction with the accompanying drawings of which:

Figure 5A:
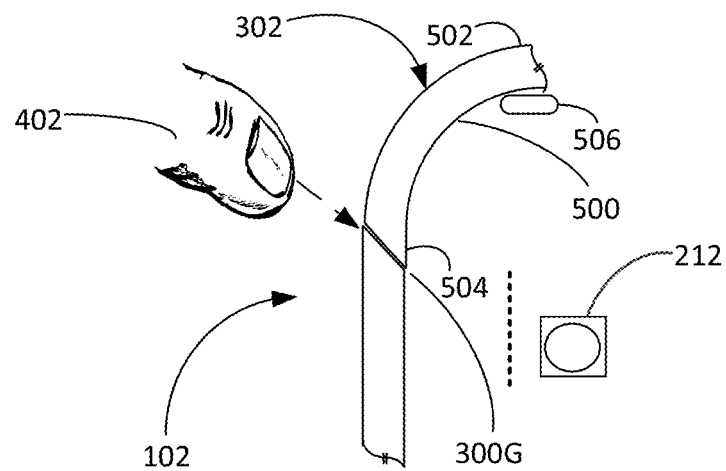
Figure 5B:
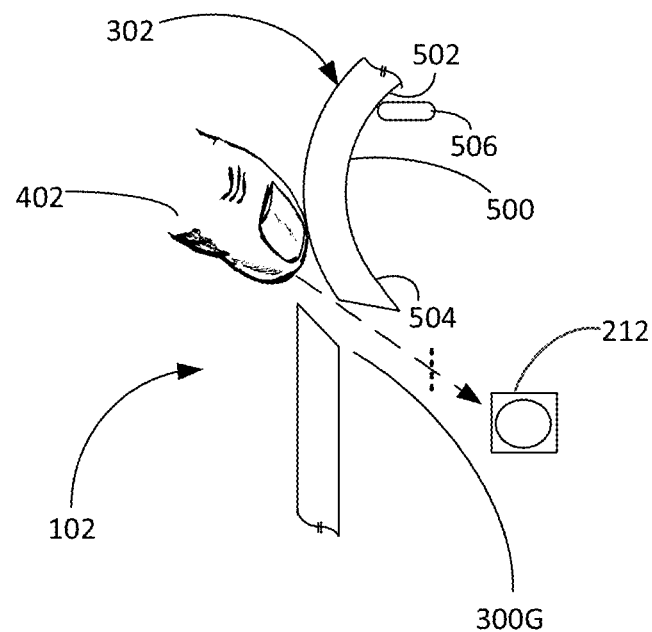
Figure 6A:
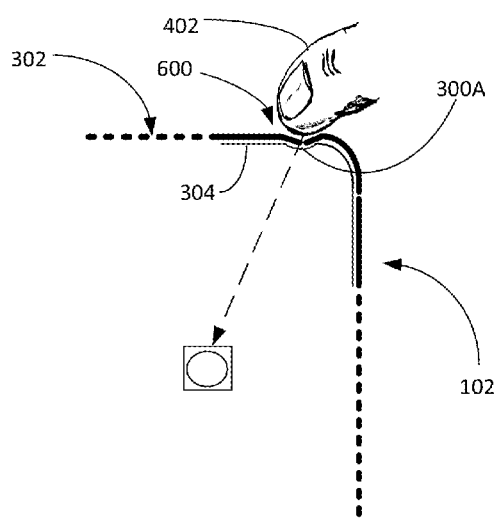
Figure 6C:
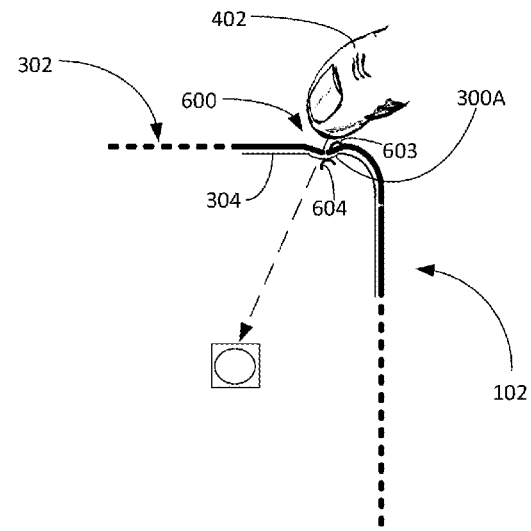
Figure 6B:
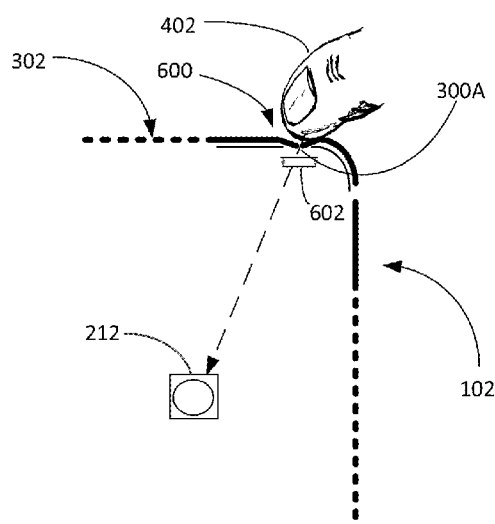
Figure 6D:
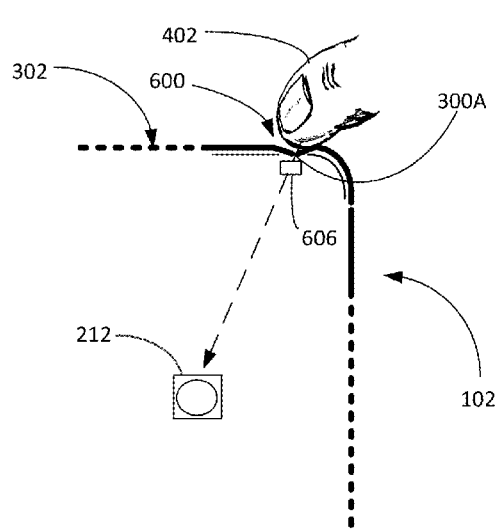

FIG. 3A, FIG. 3B, FIG. 3C, and FIG. 3D are block diagrams showing different infrared sensor configurations of the electronic device according to various embodiments;

FIG. 4A, FIG. 4B, FIG. 4C, and FIG. 4D are block diagrams showing different embodiments of the flexible portion of the housing of the electronic device;

FIG. 5A and FIG. 5B are block diagrams showing an implementation of the shutter for the housing of the electronic device; and FIG. 6A, FIG. 6B, FIG. 6C, and FIG. 6D are block diagrams showing embodiments that use a moveable portion on the housing of the electronic device.

DESCRIPTION

The disclosure is directed to an electronic device that uses one or more infrared sensors to detect infrared light from a person's body (e.g., a user's finger) to initiate a function of the electronic device. According to an embodiment, the housing of the electronic device includes a flexible portion that opens an aperture in response to external pressure (e.g., a user pressing down on the flexible portion) to allow infrared light from the person's body to reach an infrared sensor. When the infrared sensor detects the infrared light, it generates a signal in response. A processor of the electronic device receives the signal and, in response, initiates a function of the electronic device. The function may be any function that the electronic device is capable of performing, such as a power-on function, a camera function, changing the speaker volume, and launching an application.

In an embodiment, the housing of the electronic device includes a shutter that uncovers an aperture in response to external pressure (e.g., a user pressing down on the shutter) to allow infrared light (e.g., heat emanated at longer infrared wavelengths, such as from about 4 micrometers to about 15 micrometers) from the person's body to reach the infrared sensor.

According to an embodiment, the housing of the electronic device has a portion that is movable in the direction of the infrared sensor. The movable portion has an aperture. In this embodiment, the infrared sensor is configured to detect the movement of an infrared source (such as a person's finger) in the direction of the infrared sensor at the aperture when the infrared source exerts pressure on the movable portion. When the infrared sensor detects the movement, it responds by generating a signal. The processor, in response to receiving the signal, initiates a function of the electronic device, examples of which are provided above.

Figure 1A:
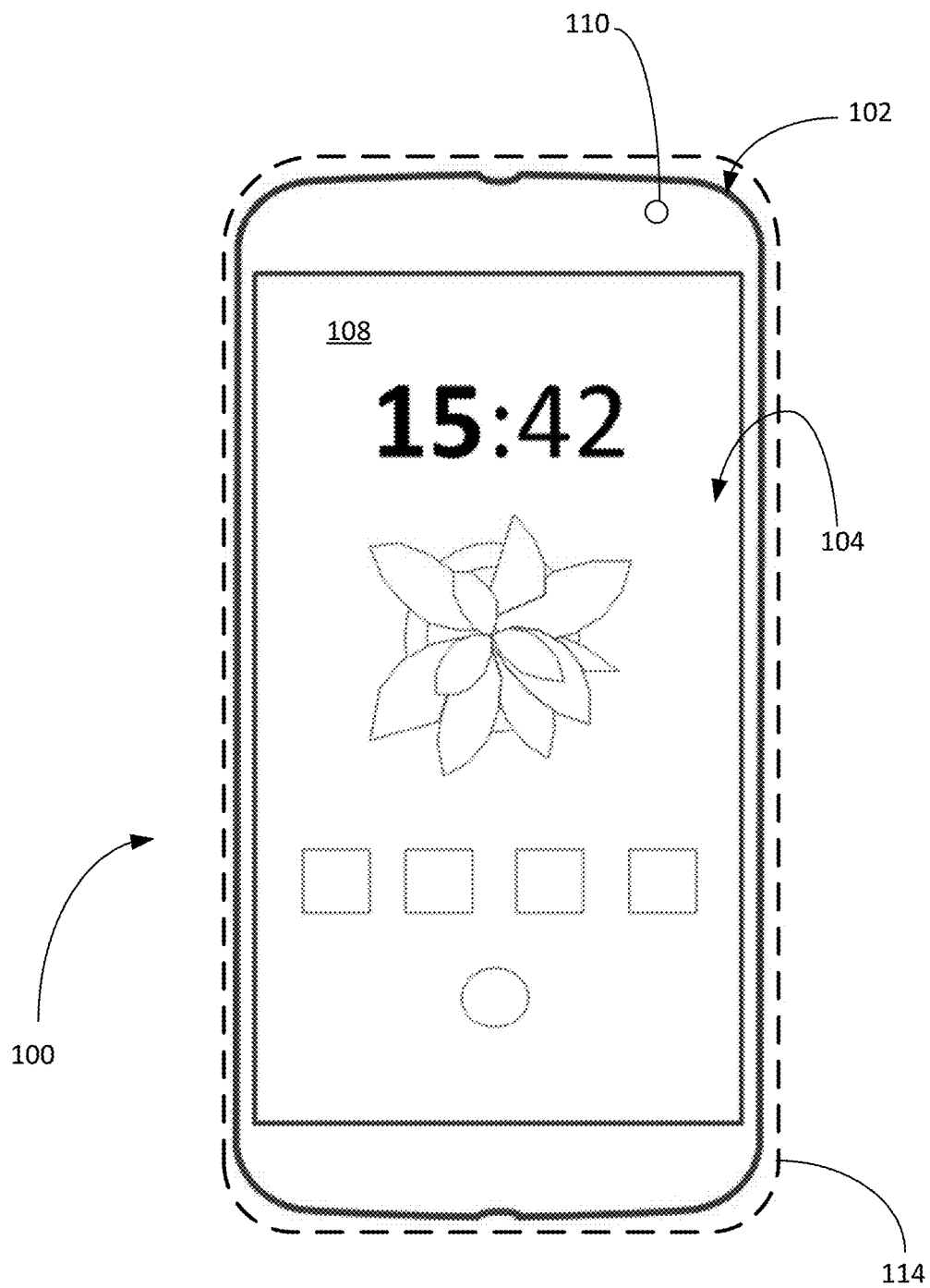
FIG. 1A is a front view of an electronic device, which is depicted as a mobile device in the drawing, according to an embodiment.
Figure 1B:
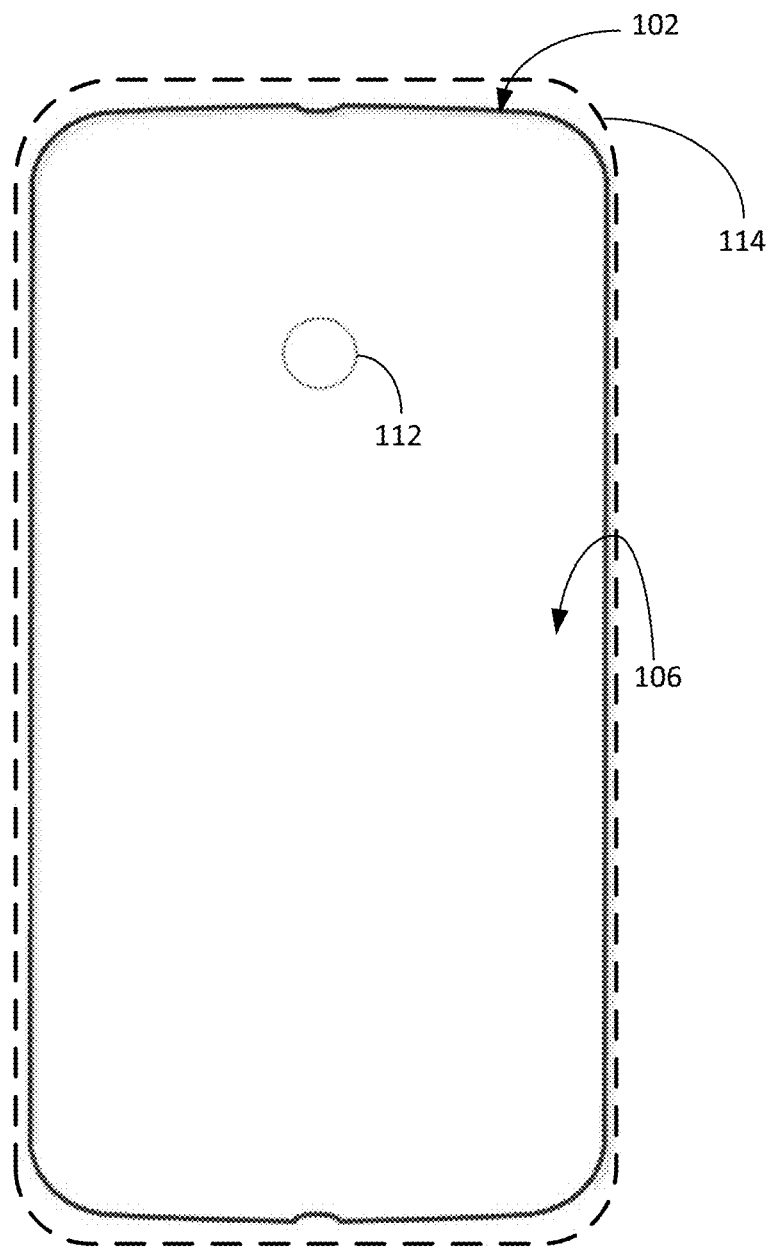
FIG. 1B is a rear view of the electronic device of FIG. 1A.

Turning to FIG. 1A and FIG. 1B, an embodiment of the electronic device 100 includes a housing 102 having a front side 104 and a rear side 106. Set within the front side 104 of the housing 102 is a display 108 and a first imager 110 (e.g., a front facing camera). Set within the rear side 106 of the housing 102 is a second imager 112 (e.g., a rear facing camera). Although depicted in FIG. 1 as a smartphone, the electronic device 100 may be implemented as other types of devices, including a tablet computer, portable gaming device, and a wearable device (e.g., a smart watch). In some embodiments, the electronic device 100 includes a ring 114 around the perimeter of the housing 102.

Figure 2:
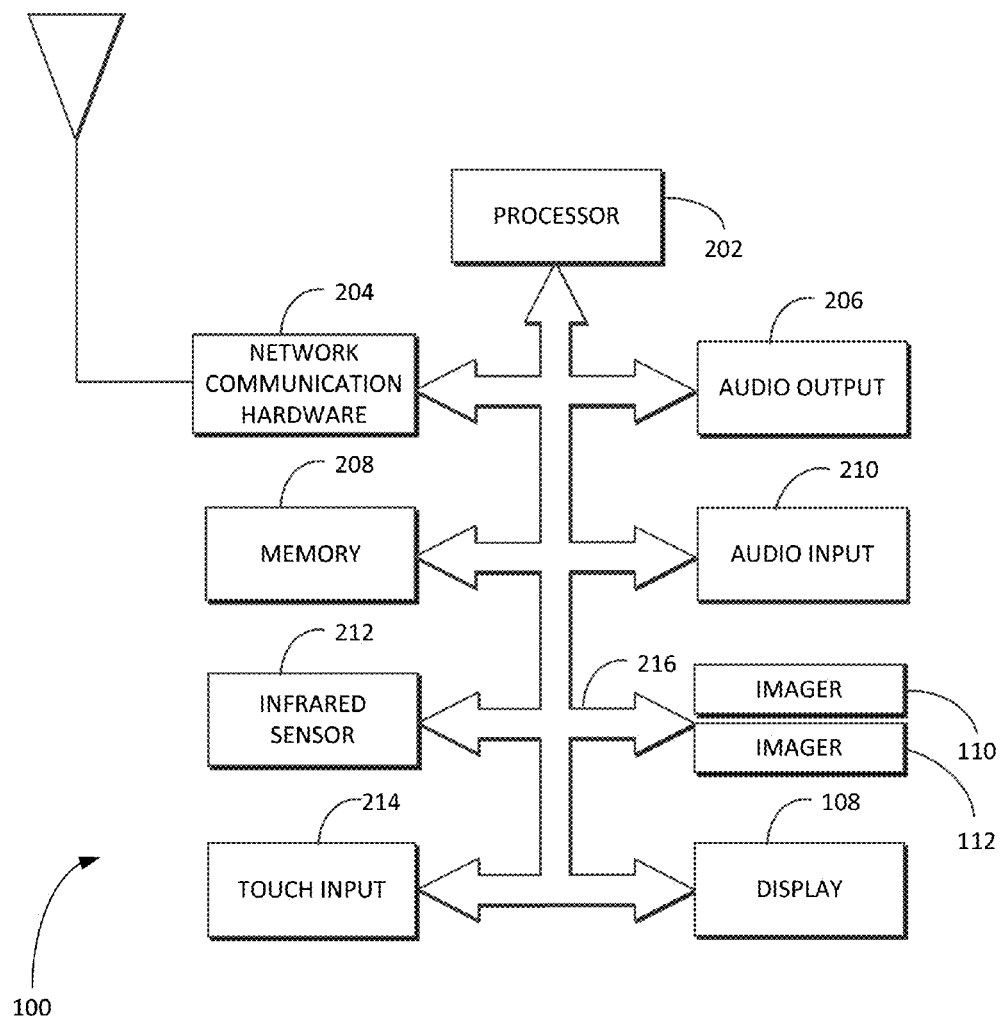
FIG. 2 is a block diagram that shows example components of the electronic device.

Turning to FIG. 2, an embodiment of the electronic device 100 also includes, within the housing 102, a processor 202, network communication hardware 204 (e.g., WiFi chip or a cellular baseband chipset), an audio output 206 (e.g., a speaker), a memory 208 (which can be implemented as volatile memory or non-volatile memory), an audio input 210 (e.g., a microphone), an infrared sensor 212 (e.g., a passive infrared detector such as a digital thermopile sensor), and a touch input 216 (e.g., a capacitive touch sensor integrated with the display 108, resistive, thermal, or acoustic). Each of the elements of FIG. 2 is communicatively linked to one or more other elements via one or more data pathways 216. Possible implementations of the data pathways 216 include wires, conductive pathways on a microchip, and wireless connections. Possible implementations of the processor 202 include a microprocessor and a controller. In various embodiments, the processor 202 retrieves instructions and data from the memory 208 and, using the instructions and data, carries many of the methods described herein.

Turning to FIG. 3A, the housing 102 includes apertures 300, which are individually labeled 300A-H, each of which forms a passage through a wall 302 of the housing 102. The apertures are depicted as being open in FIGS. 3A-3C, but in some embodiments (which will be discussed below), the apertures may be open or closed. In other embodiments, the apertures 300 remain open. When the apertures 300 are open, infrared light is permitted to pass from outside of the housing 102 and through the wall 302. The infrared light strikes the infrared sensor 212, which responds by generating a signal. In some embodiments, the signal is commensurate with the amount of infrared light that the infrared sensor 212 detects. For example, in one implementation, the infrared sensor 212 generates a signal in response to detecting long-wave infrared ("LWIR") light (having a wavelength of about 4 micrometers to about 15 micrometers), which is the kind of infrared light emitted by the human body. Thus, when a person's hand or finger is present at or near the aperture within the line-of-sight ("LOS") of the infrared sensor 212, the infrared sensor 212 generates the signal, and when the person's hand or finger is not at or near the aperture (or is removed from the aperture), the infrared sensor 212 does not generate a signal (or ceases to generate the signal). The angle and position of each aperture 300 may be different than shown in FIGS. 3A, 3B, and 3C, depending on the design of the device 100. FIG. 3D shows the device of FIG. 3A having apertures 300 at a different angle.

In other embodiments, the signal is commensurate with a change in the amount of infrared light detected. For example, in one implementation, the infrared sensor 212 generates a signal in response to detecting a change in the amount of LWIR it detects. Thus, when a person's hand or finger is not present at or near the aperture, or is present but is not moving, the infrared sensor 212 does not generate a signal. But when the person's finger is pressed into aperture (e.g., when the wall 302 is flexible enough to permit this) toward the infrared sensor 212 (i.e., changing the amount of LWIR that reaches the infrared sensor 212), the infrared sensor 212 generates the signal until the person's finger stops moving.

Turning to FIGS. 3B and 3C, other embodiments of the electronic device 100 include multiple infrared sensors 212 (individually labeled 212A-212D), each of which is linked to the processor 202 in the same way that the individual infrared sensor 212 is in FIG. 2. In these embodiments, infrared light entering different apertures will cause different infrared sensors to react. This setup allows the processor 202 to determine where a person has put his or her finger. In other words, by being able to identify which infrared sensor is sensing LWIR, the processor 202 can determine which "button" the user has pressed.

Referring still to FIGS. 3A-3D, in an embodiment, the wall 302 in the vicinity of each aperture 300 is configured such that the aperture 300 is closed so as to block the passage of LWIR light when there is no pressure on the wall in the vicinity. The wall in the vicinity of the aperture 300 is also configured to open the aperture 300 in response to pressure on the wall in the vicinity of the aperture. As noted previously, when the aperture 300 opens, it permits LWIR to pass from outside of the housing 102, through the wall 302, and strike the infrared sensor 212 (or one or more of the infrared sensors 212A-212D). In some embodiments, the electronic device 100 has a membrane 304 in front of each aperture that is transparent to LWIR. The membrane 304 is located within the LOS between the aperture and the IR sensor. When the LWIR light strikes the infrared sensor 212, the infrared sensor 212 responds by generating a voltage signal, which it transmits to the processor 202. When the processor 202 receives the signal, it responds by initiating a function of the electronic device 100. Possible functions include those that would be expected from a button press (i.e., any function that the electronic device is capable of performing, such as a power-on function, a camera function, changing the speaker volume, and launching an application). In some embodiments, the wall 302 includes a shutter for each aperture to open and close the aperture 300. In other embodiments, the wall 302 includes a flexible portion near each aperture 300, which allows the aperture 300 to be opened and closed in response to the application or removal of external pressure on the flexible portion.

Referring to FIGS. 4A and 4B, in one embodiment, the electronic device 100 includes a flexible portion 400, at which the wall 302 is made of a flexible material (e.g., rubber) or is supported by a flexible material. As noted above, the apertures 300A and 300B are within an LOS of the infrared sensor 212. In the embodiment shown in FIGS. 4A and 4B, each aperture is a slit that extends from the exterior of the housing 102 to the interior of the housing. The flexible portion 400 is configured such that when there is no external pressure on the flexible portion 400 in the vicinity of an aperture, the flexible portion 400 stays in a first configuration (shown in FIG. 4A) in which it keeps the aperture closed so as to block the passage of LWIR light. The flexible portion 400 is also configured to respond to external pressure (such as the press of a person's finger 402) by changing from the first configuration to a second configuration (shown in FIG. 4B) in which the flexible portion 400 opens the aperture. In some embodiments, the flexible portion 400 can open and close the aperture in a gradated manner. For example, the flexible portion 400 may be configured to enter a first configuration in response to a first amount of pressure (e.g., a light press from a user's finger 402) and enter a second configuration in response to a second amount of pressure (e.g., a firm press of a user's finger 402). In the first configuration, the flexible portion 400 would permit a first amount of LWIR light to pass through the aperture, and in the second configuration the flexible portion 400 would permit a second, larger amount of LWIR light to pass through the aperture (i.e., the flexible portion widens the aperture in response to external pressure). The flexible portion 400 can be designed to provide tactile type of feedback by, for example, spring loading it, locating a dummy popple underneath that will deform when pressed under the flexible portion 400, by piezoelectric vibration, by electroactive polymer, by a local haptic feedback mechanism, or by a global haptic feedback mechanism.

According to an embodiment, the wall 302 includes multiple segments, in which some are flexible and some are rigid. For example, in FIG. 4A, a first segment 302A may be rigid, a second segment 302B may be flexible, and a third segment 302C may be rigid. In another example, the first segment 302 may be rigid, the second segment 302B may be flexible, and the third segment 302C may be flexible.

Referring to FIGS. 4C and 4D, in one embodiment, the flexible portion 400 is made up of segments of the housing itself or segments of a ring 114 (shown in FIGS. 1A and 1B) around the perimeter of the housing 102. In FIGS. 4C and 4D, a first segment 404 of the flexible portion is next to a second segment 406 of the flexible portion 400. The first segment 404 is moveable with respect to the second segment 406 to form the aperture 300A as a gap between the first segment 404 and the second segment 406 to permit LWIR light to pass from the outside of the housing 102, through the aperture 300A, to the inside of the housing 102 in response to external pressure on the flexible portion 400. In an embodiment, the first segment 402 is constitutes a structure that is part of the housing 102, but moves independently of the rest of the housing 102. Furthermore, the first segment 402 may be one of many similar segments, each of which moves independently of the rest of the housing 102. In alternate embodiment, the flexible portion 400 is made of a deformable material that, when pressed or squashed, it deforms, thereby causing an aperture 300 to open up under the deforming or the stretching tension of the material.

Referring to FIGS. 5A and 5B, in another embodiment, the housing 102 has a shutter 500 in the vicinity of the aperture (aperture 300G in this example). The shutter 500, which may be a rigid structure or a flexible structure, has a first end 502 and a second end 504. The first end 502 is attached to a fixed structure 506 on the housing at a pivot point. The shutter 500 is biased to a closed position (shown in FIG. 5A). In other words, the shutter 500 is configured such that when there is no external pressure on the shutter, the shutter is in a first position (FIG. 5A), in which it covers the aperture so as to block the passage of LWIR light. The shutter 500 is also configured to respond to external pressure (such as the press of a person's finger 402) by changing from the first configuration to a second configuration (shown in FIG. 5B), in which the shutter uncovers the aperture. In doing so, the shutter 500 pivots about the pivot point to open the aperture to permit LWIR light to pass from outside of the housing 102, through the wall 302. The LWIR light then strikes the infrared sensor 212.

The flexible portion 400 of FIGS. 4A-4D or the shutter of FIGS. 5A and 5B may also include a structure, such as a popple, that provides tactile feedback to the user's finger when the user presses on the flexible portion 400 or the shutter 500. The flexible portion 400 may also have a haptic vibrator mechanism or a local vibratory source that vibrates in response to external pressure being exerted on the flexible portion 400.

Referring to FIGS. 6A-6D, in an embodiment, the housing 102 includes a moveable portion 600 that is movable in the direction of the infrared sensor 212. The movable portion 600 includes an aperture (the aperture 300A in this example) that permits LWIR light to pass from the outside of the housing 102 to the infrared sensor 212. When an LWIR source, such as person's finger 402, presses on the movable portion 600, the movable portion 600 moves (e.g., flexes or stretches to accommodate the movement) toward the infrared sensor 212. The infrared sensor 212 detects the movement of the LWIR source and generates a signal in response to the movement. When the processor 202 receives the signal, it responds by initiating a function of the electronic device 100. Possible functions include those described previously. In some embodiments, the movable portion includes a structure 602 (such as an internal button) (FIG. 6B) that is resistive (e.g., spring-loaded), a tactile locator 603 (to help ease the user's finger positioning, a tactile feedback structure 604 (such as a popple) located beneath the surface of the wall 302 (FIG. 6C) that provides tactile feedback, or a vibrating element 606 (such as a haptic vibrator or local vibratory source) (FIG. 6D) that vibrates in response to the external pressure.

It should be understood that the exemplary embodiments described herein should be considered in a descriptive sense only and not for purposes of limitation. Descriptions of features or aspects within each embodiment should typically be considered as available for other similar features or aspects in other embodiments. While one or more embodiments of the have been described with reference to the figures, it will be understood by those of ordinary skill in the art that various changes in form and details may be made therein without departing from their spirit and scope of as defined by the following claims.

We claim:

1. An electronic device comprising:
   an infrared sensor;
   a housing comprising a plurality of segments around a perimeter of the housing, wherein the plurality of segments comprises a rigid first segment, a flexible second segment, and a rigid third segment around the perimeter of the housing, and wherein the flexible second segment is positioned between the rigid first segment and the rigid third segment, the flexible second segment defining an aperture between the rigid first segment and the flexible second segment, wherein the flexible second segment is made of a deformable material, wherein the flexible second segment is configured to deform in response to an external pressure to change from a first configuration in which the flexible second segment keeps the aperture closed to block infrared light, to a second configuration in which the flexible second segment opens the aperture to permit a first amount of infrared light from a person's body to pass from an outside of the housing, through the aperture, to an inside of the housing and to the infrared sensor;
   wherein the infrared sensor is disposed within the housing and configured to:
      detect a change from the first amount of infrared light to a second amount of infrared light occurring in response to a change in a size of the aperture occurring while the aperture is open, wherein the change from the first amount of infrared light to the second amount of infrared light corresponds to the change in the size of the aperture, and
      generate a signal in response to detecting the change from the first amount of infrared light to the second amount of infrared light occurring in response to the change in the size of the aperture; and
   a processor configured to:
      receive the signal, and
      initiate a function of the electronic device in response receiving to the signal.

2. The electronic device of claim 1, wherein the flexible second segment is configured to, in response to the external pressure, change from permitting the first amount of infrared light to pass through the aperture to permitting to the second amount of infrared light to pass through the aperture.

3. The electronic device of claim 2, wherein the first amount is less than the second amount.

4. The electronic device of claim 2, wherein the first amount is greater than the second amount.

5. The electronic device of claim 1, wherein the flexible second segment comprises a structure configured to provide tactile feedback in response to the external pressure.

6. The electronic device of claim 5, wherein the structure is selected from the group consisting of a mechanical popple, a haptic feedback vibrator, and a local vibratory source.

7. The electronic device of claim 1, wherein the aperture is a slit extending from the exterior of the housing to the interior of the housing.

8. The electronic device of claim 1, wherein the flexible second segment comprises a membrane that is transparent to long-wavelength infrared light.

9. The electronic device of claim 1, wherein the infrared light from the person's body is long-wavelength infrared light.

10. An electronic device comprising:
    a housing;
    an infrared sensor disposed within the housing,
    wherein the housing comprises a plurality of segments around a perimeter of the housing, wherein the plurality of segments comprises a rigid first segment, a movable second segment, and a rigid third segment around the perimeter of the housing, and wherein the second segment is positioned between the rigid first segment and the rigid third segment, wherein the movable second segment stretches in a direction of the infrared sensor, wherein the moveable second segment comprises an aperture that, in response to external pressure on the moveable second segment, stretches to change from a first configuration in which the movable second segment keeps the aperture closed to block infrared light, to a second configuration in which the movable second segment opens the aperture to permit a first amount infrared light to pass from the outside of the housing to the infrared sensor, wherein the infrared sensor is configured to:
  detect, based at least in part on a change from the first amount of infrared light to a second amount of infrared light occurring in response to a change in a size of the aperture occurring while the aperture is open, movement of an infrared source in the direction of the infrared sensor at the aperture when the infrared source exerts pressure on the movable second segment, wherein the change from the first amount of infrared light to the second amount of infrared light corresponds to the change in the size of the aperture, and
  generate a signal, based at least in part on detecting the change in the amount of infrared light as a result of the change in the size of the aperture, in response to the detected movement; and a processor configured to receive the signal and initiate a function of the electronic device in response to receiving the signal.

11. The electronic device of claim 10, wherein:
the movable second segment comprises a slit that defines the aperture,
the slit is configured to widen the opening as the infrared source exerts pressure on the movable second segment.

12. The electronic device of claim 10, wherein the moveable second segment moves independently of the rest of the housing.

13. An electronic device comprising:
a housing;
an infrared sensor disposed within the housing,
wherein the housing comprises a plurality of segments around a perimeter of the housing, wherein the plurality of segments comprises a rigid first segment, a movable second segment, and a rigid third segment around the perimeter of the housing, and wherein the second segment is positioned between the rigid first segment and the rigid third segment, wherein the movable second segment flexes in a direction of the infrared sensor, wherein the moveable second segment comprises an aperture that, in response to external pressure on the moveable second segment, flexes to change from a first configuration in which the movable second segment keeps the aperture closed to block infrared light, to a second configuration in which the movable second segment opens the aperture to permit a first amount infrared light to pass from the outside of the housing to the infrared sensor, wherein the infrared sensor is configured to:
  detect, based at least in part on a change from the first amount of infrared light to a second amount of infrared light occurring in response to a change in a size of the aperture occurring while the aperture is open, movement of an infrared source in the direction of the infrared sensor at the aperture when the infrared source exerts pressure on the movable second segment, wherein the change from the first amount of infrared light to the second amount of infrared light corresponds to the change in the size of the aperture, and
  generate a signal, based at least in part on detecting the change in the amount of infrared light as a result of the change in the size of the aperture, in response to the detected movement; and a processor configured to receive the signal and initiate a function of the electronic device in response receiving to the signal.

14. The electronic device of claim 13, wherein:
the movable second segment comprises a slit that defines the aperture,
the slit is configured to widen the opening as the infrared source exerts pressure on the movable second segment.

15. The electronic device of claim 13, wherein the moveable second segment moves independently of the rest of the housing.

16. The electronic device of claim 1, wherein the electronic device comprises a mobile device.

\* \* \* \* \*